1ST LESSON

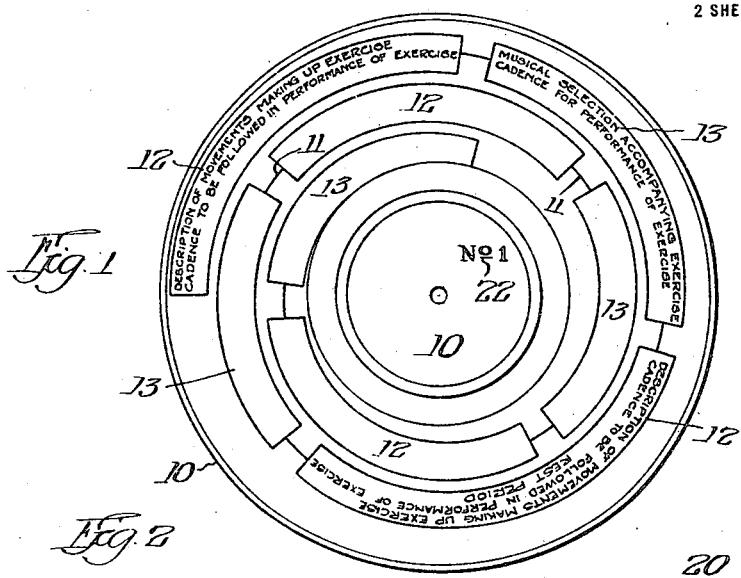

In starting this course resolve to do each and every one of the exercises with a will. My course will get results quickly if you put your earnest thought and energy into every movement.

FIRST EXERCISE

On the Count One — Raise right leg as high as possible, holding knee stiff

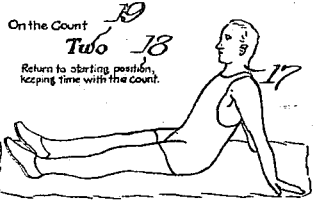

On the Count Two — Return to starting position, keeping time with the count.

and repeat as counted — one — two, one — two, one — two, etc., until counting stops

SECOND EXERCISE

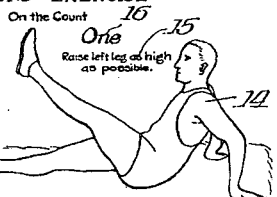

On the Count One — Raise left leg as high as possible.

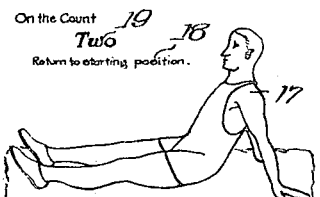

On the Count Two — Return to starting position.

W. M. ROGERSON.
EDUCATIONAL APPLIANCE.
APPLICATION FILED MAY 4, 1922.

1,435,660.

Patented Nov. 14, 1922.
2 SHEETS—SHEET 2.

Witness:

Inventor:
Wallace M. Rogerson

Patented Nov. 14, 1922.

1,435,660

UNITED STATES PATENT OFFICE.

WALLACE M. ROGERSON, OF CHICAGO, ILLINOIS, ASSIGNOR TO WALLACE INSTITUTE, OF CHICAGO, ILLINOIS, A CORPORATION OF ILLINOIS.

EDUCATIONAL APPLIANCE.

Application filed May 4, 1922. Serial No. 558,492.

*To all whom it may concern:*

Be it known that I, WALLACE M. ROGERSON, a citizen of the United States, residing at Chicago, in the county of Cook and State of Illinois, have invented certain new and useful Improvements in Educational Appliances, of which the following is a specification.

The present invention is related to appliances designed primarily for physical education and culture.

Its main and primary object is to provide appliances of this nature which will utilize the talking machine as the means for imparting audible instruction to the pupil, the actual instruction as to the exercises to be followed for producing the intended physical benefits and effects being recorded in suitable sequence on sound records. Correlated with the records containing the audible instruction are illustrated charts depicting in proper fashion the individual movements of the exercises made the subject of the audible instruction of the sound records, thereby visualizing to the pupil the several exercises recorded on the records, and enabling the pupil to observe the correct delineation of the exercises embraced by the audible instruction. Each chart illustrates the group of exercises recorded on an individual sound record, and thus the chart has a direct educational relation and value to that record. The several movements making up each exercise are depicted individually by the illustration of a human model correctly positioned in the poses to be assumed by the pupil in the performance of that exercise, and the depiction of each of the poses embraced by each exercise is accompanied by a brief description of the movement, the combined movements and the combined descriptions thereof being based on a regular cadence to be followed for attaining rhythm in the performance of the exercises. This visual indication of the several exercises by the charts, the description thereon, and the indicated cadence to be followed in their performance, correspond to like audible indication recorded on the sound record, thus synchronizing the visual and audible indications of the exercises, and enabling the pupil to follow strictly the exercises in their relation to each other.

On the sound record, the groove thereof is divided into periods or areas in which are recorded the oral instructions corresponding to the visual indications of the chart. Interspersed or alternating with such periods or areas of the groove are other periods or areas wherein are recorded musical renditions or selections and also concurrent audible indication by the instructor of the cadence for the rythmic performance of the exercises. The pupil, therefore, adapting himself to the measured time of the musical rendition or selection and the concurrent audible indication by the instructor of the cadence of the movement, conforms himself to that cadence until the audible indication ceases and the exercise terminates. Thereupon a period of rest follows to enable the pupil to recover from possible fatigue or other slight discomfort resulting from the exercise, and during this period of rest audible indication is given by the record as to the nature and characteristics of the exercise which next is to ensue.

The invention further aims to provide appliances of the character set forth wherein and whereby facilities and instrumentalities for physical education and culture are available for use in the privacy of the home, and at the convenience of the pupil, thereby eliminating the necessity for attendance at gymnasia or reaction centers for performance of the exercises. At the same time, the invention places at the disposal of the pupil the services of a skilled instructor, accompanied by a comprehensive and accurate visual presentation of the exercises to be followed, together with definite and interpretative audible exposition of the exercises, so that the pupil not only hears the exercises explained, but likewise is able to discern by the eye the correct performance thereof.

Other objects and advantages will appear as the nature of the improvements is better understood, the invention consisting substantially in the novel arrangement and correlation of instrumentalities hereinafter fully described, illustrated in the accompanying drawings, and finally pointed out in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive, standpoint.

In the drawings—

Fig. 1 is a face elevation, diagrammatically represented, of a sound record which forms one of the instrumentalities of the herein described educational appliance, and by means of which audible indication of the exercises to be taught is effected.

Fig. 2 is a similar elevation, also diagrammatically represented, of one of the charts for visualizing to the pupil the several exercises recorded on the record illustrated in Fig. 1.

Figure 3:
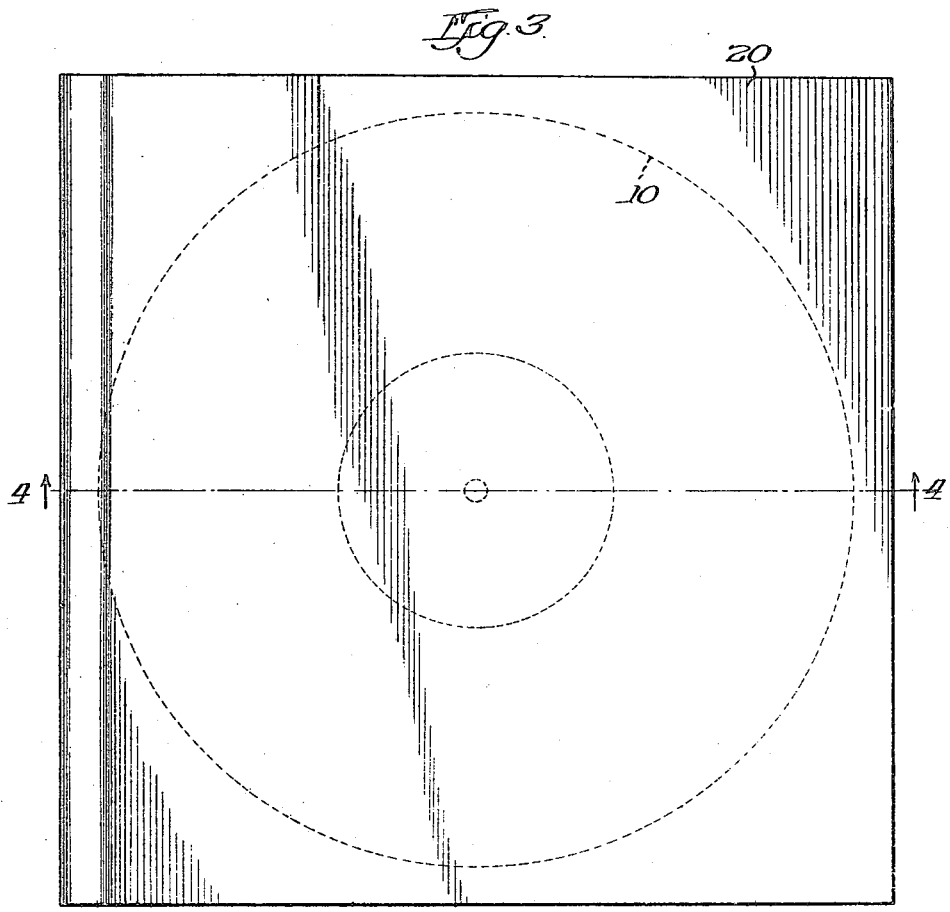
Fig. 3 is a plan view of the record and chart of the preceding figures in their assembled relation.
Figure 4:
Fig. 4 is a cross-section on the line 4—4, Fig. 3.

Referring in detail to the accompanying drawings, and particularly to Fig. 1 thereof, the numeral 10 designates a sound record such as employed with the usual type of talking machine now found commonly in commerce. The form of this record, of course, is immaterial. It may be of the disk type, or it may be a cylinder, and the form of the talking machine with which the record is employed need correspond only to the type of record which is used. Furthermore, it is of no material consequence to the present invention as to whether one or more of the records 10 is or are employed, although the preferred embodiment of the invention contemplates one record for each chart, that is to say, the matter recorded on one record embraces the necessary instruction for the exercises depicted by one chart, whether there be one or more of such exercises.

The record 10 bears the usual sound groove 11, impressed thereon in the usual manner or method of manufacture. If desired, the first portion of the record, or the first record in its entirety, if there be more than one, may contain a general lecture or statement expository of the group of exercises which constitutes the entire course of instruction. But this is not essential, and the same may be omitted without departing from the salient features of the invention.

At spaced intervals in the groove 11 are periods or areas 12 wherein are recorded descriptions of the several exercises, and likewise of the several movements making up each of the exercises. Therefore, in the reproduction of the record when the latter is placed in a talking machine, audible instruction as to these exercises follows, and the pupil obtains the benefit of this instruction which, in the first instance, is recorded by the director skilled in physical education and culture. The periods or areas 12 likewise record the cadence which is to be followed in the performance of the exercise as described by the instructor when describing the exercise, or the movements embraced by the exercise, and at the time that the description of the exercise is reproduced the recorded cadence for the performance of the exercise likewise is reproduced.

Interspersed with the periods or areas 12 are intervening periods or areas 13 wherein are recorded musical renditions or selections for the rhythmic performance of the exercises by the pupil. The tempo of the renditions or selections is determined by and conforms to the cadence which the instructor adopts for the exercise. Each of these periods 13 contains the musical rendition or selection which accompanies the exercise or movements as described in the preceding period 12. Each of the periods 13 also has recorded therein, concurrently with the recording of the musical rendition, the audible indication by the instructor of the cadence for the performance of the exercise. For instance, the count of "1" and "2" to which the tempo of the music is measured, and adapted to the movement or movements of the exercise, audibly indicates to the pupil the instructor's cadence for the performance of such movement or movements. When the reproduction of this audible indication ceases the end of the movement or movements has been reached, and the performance thereof completed. The period 13 of such audible indication and instruction as to the cadence thereof thereupon merges into the next succeeding period 12 of audible instruction as to the nature and character of the next succeeding exercise to be followed or performed. This next succeeding period 12 also constitutes a rest period for the pupil for relief and recovery from such fatigue, shortness of breath, or other discomfort which may result from the performance of the preceding exercises, and during the reproduction of the matter recorded in such succeeding period 12 the pupil is instructed as to the exercise and the movements thereof.

To carry into effect the visual indication of the instruction audibly given by the sound record 10 is the purpose of the chart illustrated in Fig. 2. As before stated, each chart preferably illustrates the group of exercises recorded on an individual record, together with the several movements which make up each of such exercises. It is but necessary to describe the depiction of the chart as it concerns one exercise, the other exercises being depicted in similar manner. Referring, therefore, particularly to Fig. 2, the numeral 14 designates the illustration of a human model which is correctly positioned in the pose to be assumed by the user in the performance of the first movement of the exercise. Associated with that particular illustration is a brief description 15 of that movement, and likewise an indicating symbol 16 to denote one count of the cadence which is observed in the execution of that movement. The numeral 17 designates the pose of the model to be assumed by the pupil in the performance of the second movement of the exercise, 18 the brief description of that movement, and 19 the indicating symbol to denote the count of the cadence which is observed in the execution of that movement. The combined movements and the combined descriptions thereof, with the combined indicating symbols, are based upon the cadence audibly indicated by the record in the reproduction of the periods 13, so that the visual indication of the exercises by the chart and the audible indication thereof by the record are synchronized, thereby enabling the pupil to follow the exercises strictly. Concurrently with the audible indication of the cadence is reproduced the musical rendition or selection recorded in the periods 13, the tempo of such rendition or selection, as before suggested, being based upon the cadence of the instructor, so that the performance of the exercises follows that rhythm of the musical rendition or selection, and induces uniform action on the part of the pupil as the latter pursues the several exercises. The pupil, therefore, adapting himself to the audible indication by the instructor of the cadence of the movement, and the measured tempo of the accompanying musical rendition, conforms to that cadence until the audible indication ceases and the exercise terminates.

A convenient form of the invention contemplates the construction of the chart in the form of a folder 20 of such dimensions as to receive conveniently the sound record 10 when the chart is folded. It may be provided with a proper identifying symbol 21 to denote the relative position of the chart as a member of the entire group in the course of instruction, such, for instance, as "1st lesson," and the record 10 likewise may be provided with an identifying symbol 22 such as "No. 1," to denote likewise its relative position as a member of the entire group of records in the course, and also to denote its relation to the particular chart on which is illustrated the subject matter for visual indication which corresponds to the subject matter to be audibly indicated by that record.

In the use of the herein described invention the record 10 is placed in the talking machine and operated therein in the usual manner. Before its reproduction is started, however, the pupil places the chart in a position where the exercises depicted thereon may be observed and followed as reproduction of the instructions recorded on the record 10 is effected. Preferably, the student is instructed to follow the chart and the reproduction of the matter on the record for several successive times in advance of attempting to participate in the exercises. In this manner the audible indication by the record becomes more clearly associated with the visual indication by the chart, and the pupil thereby is better prepared to perform the several exercises. With this preparation the pupil thereupon may proceed to the performance of the exercises in the succession followed by their indication by the record and chart throughout the entire course prescribed for the particular physical benefits and effects to be attained. In such performance the charts are kept before the pupil so that the illustrated movements may be followed in connection with the audible indication of those movements by the several records. The pupil thus is afforded the advantages of instruction by a skilled physical director, and enabled to pursue the several exercises of the course in the privacy of the home, thereby eliminating the necessity for attendance at remote points and at prescribed times such as required by instruction given in gymnasia and other recreation centers.

The musical accompaniment is provided to inspire activity on the part of the pupil, and in its reproduction concurrently with the audible indication of the cadence of the movement it is found to act not only as an excitant, but to induce the pupil to greater and more uniform effort in following the cadence of the several movements included in the exercises.

I claim:

1. An educational appliance, comprising a sound record having instructions for a physical exercise recorded thereon for audible indication thereby, in combination with an indicator associated with said sound record and bearing representations illustrative of the movements described in the instructions for the exercise recorded on said record, whereby to visualize said exercise audibly indicated by the record.

2. An educational appliance, comprising a sound record having instructions for a physical exercise recorded thereon for audible indication thereby, in combination with a chart associated with said sound record and bearing representations of a human model in illustrative poses of the movements described in the instructions for the exercise recorded on said record, whereby to visualize said exercise audibly indicated by the record.

3. An educational appliance, comprising a sound record having instructions for a physical exercise recorded thereon for audible indication thereby, said record also including the cadence for the performance of said exercise, in combination with an indicator associated with said sound record and bearing representations illustrative of the movements described in the instructions for the exercise recorded on said record, said indicator also bearing indicating symbols corresponding to the cadence recorded on the record for the performance of said exercise, said indicator co-operating with said record to visualize the exercise and cadence audibly indicated by the record.

4. An educational appliance, comprising a sound record having instructions for a physical exercise recorded thereon for audible indication thereby, said record also including the cadence for the performance of said exercise, in combination with a chart associated with said sound record and bearing representations of a human model in illustrative poses of the movements described in the instructions for the exercise recorded on said record, said chart also bearing indicating symbols corresponding to the cadence recorded on the record for the performance of said exercise, said chart co-operating with said record to visualize the exercise and cadence audibly indicated by the record.

5. An educational appliance, comprising a sound record having instructions for a physical exercise recorded thereon for audible indication thereby, said record also including the cadence for the performance of said exercise, and a musical rendition the tempo of which conforms to said cadence, in combination with an indicator associated with said sound record and bearing representations illustrative of the movements described in the instructions for the exercise recorded on said record, whereby to visualize said exercise audibly indicated by the record.

6. An educational appliance, comprising a sound record having instructions for a physical exercise recorded thereon for audible indication thereby, said record also including the cadence for the performance of said exercise, and a musical rendition the tempo of which conforms to said cadence, in combination with an indicator associated with said record and bearing representations of a human model in illustrative poses of the movements described in the instructions for the exercise recorded on said record, said indicator also bearing indicating symbols corresponding to the cadence recorded on the record for the performance of said exercise, said indicator co-operating with said record to visualize the exercise and cadence audibly indicated by the record.

7. An educational appliance, comprising a sound record portions of the groove of which record instructions for physical exercises and the cadence to be observed in the performance thereof, each of said instruction-recording portions being followed by a portion which records a musical selection and the cadence for the rhythmic performance of the exercise recorded in the preceding instruction-portion of the groove, in combination with a chart associated with said sound record and bearing representations of a human model in illustrative poses of the movements described in the instructions for the exercises recorded on said record, said chart also bearing indicating symbols corresponding to the cadence recorded on the record for the performance of said exercises, said chart cooperating with said record to visualize the exercises and cadence audibly indicated by the record.

8. An educational appliance, comprising a sound record having a musical rendition recorded thereon, in combination with an indicator associated with said sound record and bearing representations of a human model in illustrative poses of physical exercises to be executed when said record is reproduced, the tempo of said musical rendition conforming to the cadence to be followed in the execution of said exercises visualized by said indicator.

9. An educational appliance, comprising a sound record having instructions for physical movements recorded thereon for audible indication thereby, said record also including differentiated sound symbols for audible reproduction in cadence for identifying said movements, in combination with a chart bearing representations illustrative of the movements identified by the respective sound symbols, whereby to visualize the movements audibly indicated by the record.

10. An educational appliance, comprising a sound record having recorded thereon for audible reproduction instructions for the execution of a plurality of successive exercises, each of which comprises a plurality of physical movements, said record also having sound symbols recorded thereon for reproduction between said instruction portions to indicate the time of starting and stopping execution of the previously-indicated exercise and the cadence in which the movements thereof are to be performed, in combination with a chart bearing representations illustrative of the several movements described in the recorded instructions of the several exercises, whereby to visualize the movements audibly indicated by the record.

11. An educational appliance, comprising a sound record having recorded thereon instructions for movements correlated to afford physical exercises and sound symbols for reproduction in the cadence to be observed in the execution of the described movements, in combination with a chart bearing representations illustrative of the movements described in the recorded instructions, whereby successive physical movements audibly indicated by the record may be observed concomitantly with such audible indication.

In witness whereof I have hereunto subscribed my name.

WALLACE M. ROGERSON.